United States Patent [19]

Berliner

[11] Patent Number: 4,667,399

[45] Date of Patent: May 26, 1987

[54] RADIALLY ASSEMBLED SPRING RETAINING RING AND POWER GUN FOR ASSEMBLING SAME

[75] Inventor: Wallace H. Berliner, Woodside, N.Y.

[73] Assignee: Waldes Truarc, Inc., Long Island City, N.Y.

[21] Appl. No.: 758,887

[22] Filed: Jul. 25, 1985

[51] Int. Cl.[4] ........................ B23Q 7/10; B23P 19/04; B23P 11/02; F16B 21/18

[52] U.S. Cl. ........................................ 29/809; 29/229; 29/450; 411/517

[58] Field of Search ................. 29/225, 229, 446, 453, 29/450, 809; 411/517, 523

[56] References Cited

U.S. PATENT DOCUMENTS

| | | | |
|---|---|---|---|
| 2,487,803 | 11/1949 | Heimann | 411/517 |
| 2,755,698 | 7/1956 | Wurzel | 411/517 |
| 2,978,802 | 4/1961 | Erdmann . | |
| 3,266,133 | 8/1966 | Kalbow | 29/229 |
| 3,442,171 | 5/1969 | Engelmann | 411/517 |
| 3,500,529 | 3/1970 | Kohout | 29/229 |
| 3,595,123 | 7/1971 | Wurzel . | |
| 3,681,839 | 8/1972 | Janecka . | |
| 3,785,037 | 1/1974 | Erdmann | 29/229 |
| 3,846,900 | 11/1974 | Weglage | 29/229 |
| 4,550,485 | 11/1985 | Killian | 29/450 |

*Primary Examiner*—Howard N. Goldberg
*Assistant Examiner*—Steven Nichols
*Attorney, Agent, or Firm*—Burns, Doane, Swecker & Mathis

[57] ABSTRACT

An applicator for installing a radially installed spring retaining ring into an external groove of a shaft comprises a ramp having a slot for receiving a groove shaft. The ramp also includes a pair of opposed side walls between which the rings travel. Each ring includes a pair of flats arranged to guidingly engage the side walls to prevent the ring from rotating as it advances along the ramp.

4 Claims, 5 Drawing Figures

RADIALLY ASSEMBLED SPRING RETAINING RING AND POWER GUN FOR ASSEMBLING SAME

RELATED INVENTION

This invention constitutes an improvement over the subject matter described in copending, commonly assigned U.S. application Ser. No. 579,559 filed on Feb. 13, 1984 by Edmund F. Killian. The disclosure of that application is hereby incorporated by reference herein.

BACKGROUND AND OBJECTS OF THE INVENTION

The present invention relates to hand applicators for installing radially assembled spring retaining rings and, in particular, for installing radially assembled spring retaining rings into external grooves of workpieces.

Radially assembled spring retaining rings, such as the type disclosed in Wurzel U.S. Pat. No. 3,595,123 issued July 27, 1971, have long been employed as stop or limiting elements on machined parts. Retaining rings of this type are installed in external grooves formed in the parts. Externally applied retaining rings are installed in external grooves by pushing the open side of the ring against the groove, causing the ring ends to separate. When the thus-expanded ring has fully entered the groove, the ring ends snap-back to secure the ring in place.

In order to facilitate the installation of radially applied rings, it has been proposed to employ a hand applicator which forcefully inserts a ring into a groove of a machine part. Hand-held applicators have been proposed, for example, in Erdman U.S. Pat. No. 2,978,802 issued Apr. 11, 1961 and Janecka U.S Pat. No. 3,681,839 issued Aug. 8, 1972.

In addition, the assignee of the present invention has heretofore marketed an applicator which comprises a hand-held housing on which is mounted a magazine and a nose assembly. The nose assembly contains a ramp along which retaining rings can be pushed, and a forwardly open slot for receiving a workpiece such as a shaft, the width of the slot being equal to the diameter of the shaft. The magazine feeds retaining rings to the ramp one-at-a-time. The housing carries a pusher and a fluid-driven mechanism for reciprocating the pusher when the user activates a trigger on the housing. When the pusher travels forwardly, it pushes a retaining ring into a groove on the workpiece. It can occur, however, that the ring can become skewed (i.e., slightly rotated about an axis oriented perpendicularly to the plane of the ring) as the ring is being pushed along the ramp toward the workpiece. If that occurs, the open end of the ring will have moved out of alignment with the groove in the workpiece and, rather than entering the groove, the ring will simply be jammed against the workpiece.

It is, therefore, an object of the present invention to minimize or obviate problems of the above-discussed type.

Another object is to provide a novel applicator for installing retaining rings into external grooves of workpieces.

An additional object is to assure that the ring will not become skewed as it travels toward the workpiece.

SUMMARY OF THE INVENTION

These objects are achieved by the present invention wherein an applicator for installing a retaining ring into an external groove in a workpiece comprises a base plate forming a ramp having a floor and a pair of side walls. A forward end of the floor includes a forwardly open slot for receiving a grooved workpiece. A groove locator is disposed on the base plate adjacent a forward end of the ramp and is arranged to enter the groove in the workpiece when the latter is received in the slot. Each retaining ring includes a pair of legs spaced apart at their forward ends to define an open forward end of the ring. The ring is positioned in the ramp with the open forward end thereof aligned with the slot. Each leg includes a flat arranged to oppose a respective one of the side walls of the ramp. The spacing between the flats is substantially the same as the distance between the side walls whereby the ring is constrained against appreciable rotation about an axis oriented perpendicularly to the plane of the ring. A pusher is provided for forwardly pushing the ring along the ramp toward the slot.

The present invention also is directed to the spring retaining ring which is configured for use with the applicator.

DESCRIPTION OF THE DRAWINGS

The objects and advantages of the invention will become apparent from the following detailed description of preferred embodiments thereof in connection with the accompanying drawings in which like numerals designate like elements, and in which.

DETAILED DESCRIPTION OF PREFERRED EMBODIMENTS OF THE INVENTION

Figure 1:
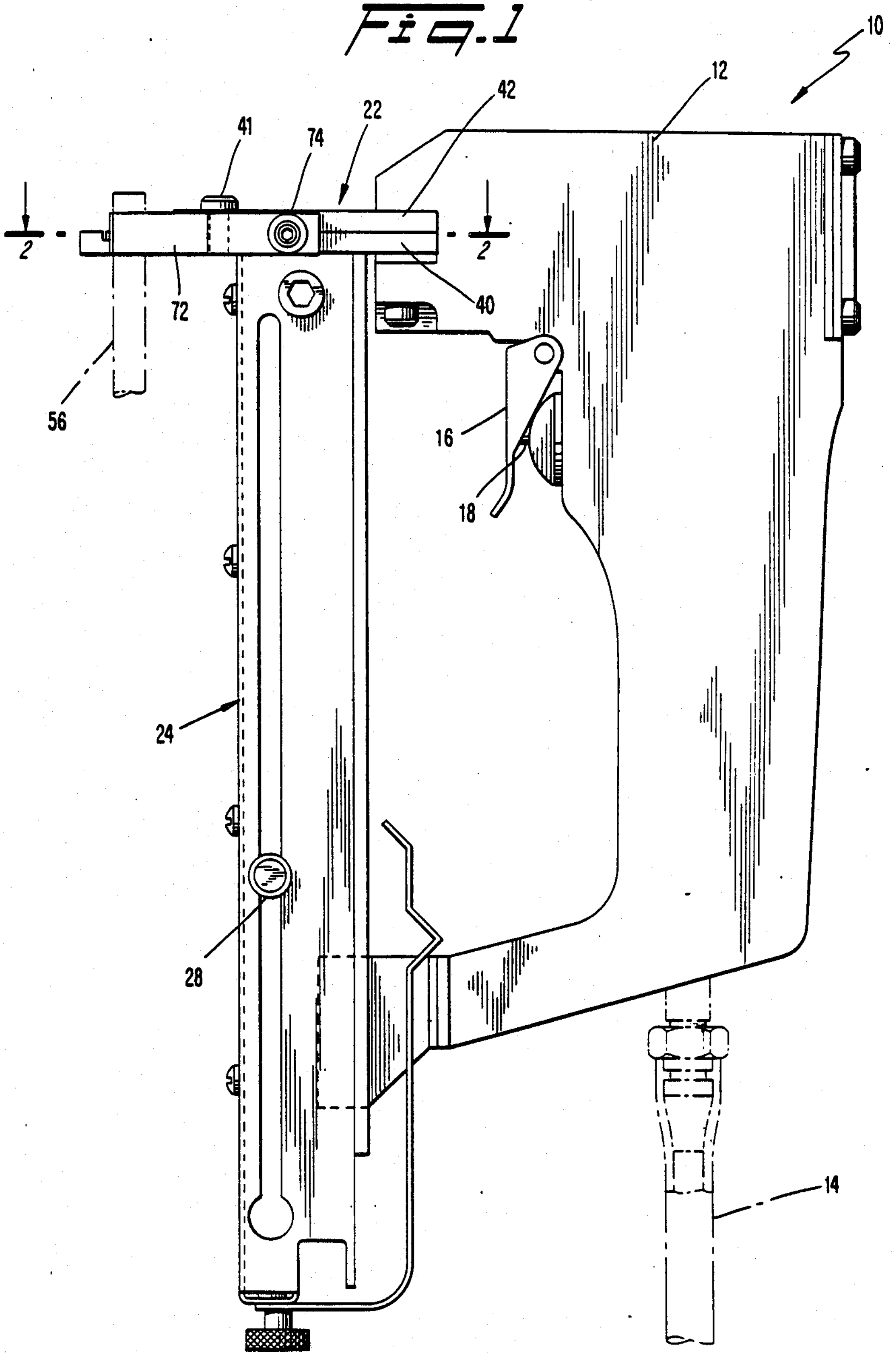
FIG. 1 is a side elevational view of an applicator for installing retaining rings according to the present invention, with a workpiece being depicted in phantom lines.
Figure 2:
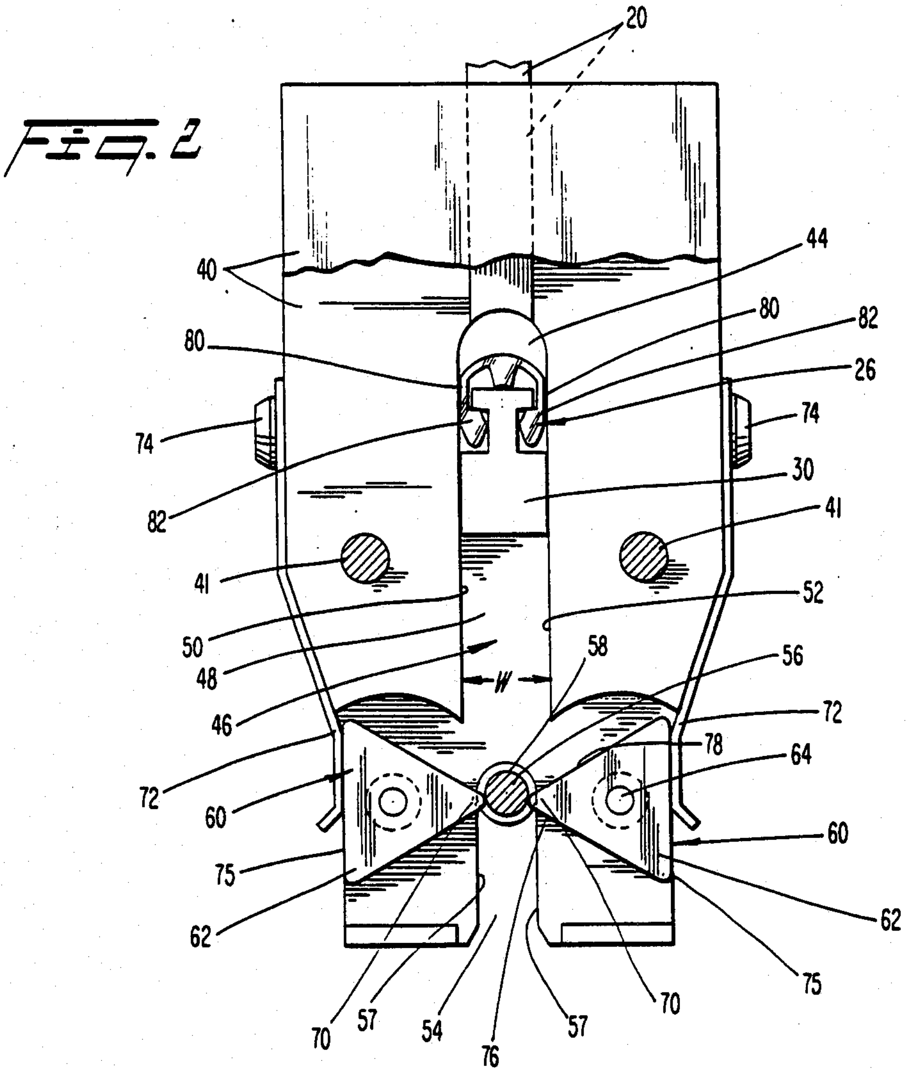
FIG. 2 is a cross-sectional view taken along the line 2—2 in FIG. 1, depicting a workpiece disposed in a slot of the applicator, with the locator fingers projecting into a groove of the workpiece.
Figure 3:
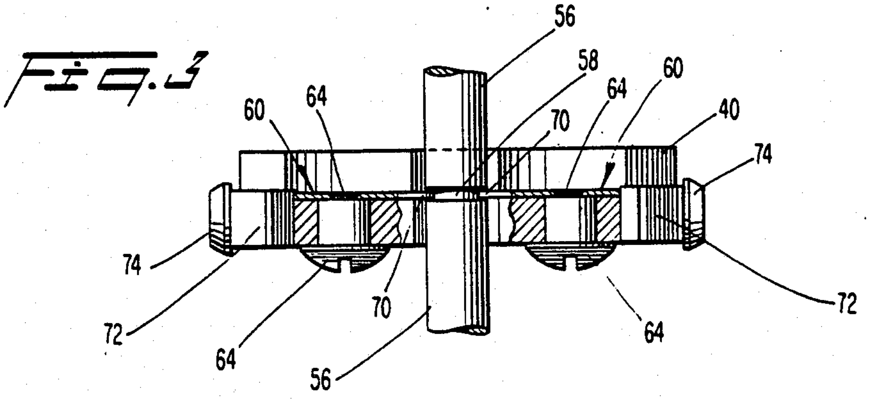
FIG. 3 is a front view of the applicator, with portions thereof broken away.

An applicator 10 for installing retaining rings is depicted in FIG. 1. The applicator comprises a hand-held gun or housing 12 which contains a fluid-driven mechanism of a conventional type. The mechanism is driven by fluid, preferably air, delivered through an inlet hose 14. A manual trigger 16 is connected to the housing for depressing an actuator pin 18. The pin 18, when depressed, activates the mechanism to reciprocate a pusher slide 20 (FIG. 2). A gun of the above-described type is conventional and is marketed by the Duo-Fast Corp. of Franklin Park, Illinois.

Mounted on the housing are a nose assembly 22 and a magazine, the latter carrying a stack of retaining rings 26 (FIG. 2). The magazine includes a spring-biased arm 28 which underlies the stack of retaining rings and urges the stack upwardly into the nose assembly 22. The retaining rings are slidably mounted upon a rail 30 (FIG. 2) disposed within the magazine. The rail terminates at the nose assembly so that the uppermost ring can be "picked-off" the stack by the pusher 20.

The nose assembly 22 comprises a base plate 40, and a cover plate 42 overlying the base plate 40 and connected thereto by bolts 41. An opening 44 in the base plate 40 communicates with the magazine and is aligned with the rail 30, such that the uppermost ring 26 in the stack of rings is pushed through the opening 44 and against the top plate 42 and is retained in that position, as depicted in FIG. 2.

The base plate includes a longitudinally extending ramp 46 which includes a floor 48 along which a picked-off retaining ring is pushed by the pusher 20. A portion of the ramp 46 includes side walls 50, 52 bordering the floor 48. The ramp 46 terminates at its forward end in the form of a slot 54 which is sized to receive a workpiece or machine part, such as a shaft 56 which includes a groove 58 in which a retaining ring 26 is to be installed. The outer diameter of the shaft 56 substantially equals the width of the slot 54, whereby the shaft 56, when disposed within the slot 54 is retained against skewing by means of two opposing side faces 57 of the slot. The width of the groove 58, i.e., its dimension parallel to the shaft axis, corresponds to the thickness of the ring 26.

The applicator as thusfar described, is similar to that which has been previously marketed by the assignee of the present invention.

At least one, but preferably two, groove locators 60 are mounted on the nose assembly adjacent a forward end thereof. Each groove locator 60 comprises a triangular body 62 rotatably mounted to the base plate 40 by a pin 64. The locator 60 rotates about the axis of the pin 64, which axis is disposed perpendicularly to the plane of the floor 48. Each corner of the locator body 62 constitutes a finger 70 which is adapted to project into the ramp 46. Accordingly, the fingers 70 can enter the ring groove 58 to align the latter with the ring 26 when the shaft 56 is disposed within the slot 54.

A pair of springs 72 in the form of leaf springs are mounted on the base plate 40 by bolts 74 and extend forwardly in cantilever fashion to bear against the locators 60. Each spring 72 engages an edge 75 of the associated locator to yieldably urge the locator 60 to a position in which the finger 70 normally extends across the shaft-receiving slot 54 and is thus normally disposed in the path of travel of the pusher 20 and a retaining ring 26 pushed thereby. In this manner, the finger 70 will be engaged by the retaining ring 26 as the latter is being pushed into the groove 58.

When the locators are in such normal position, the finger 70 of each locator is aligned with the pivot pin 64 in a direction perpendicular to the slot 54 and ramp 46. Each finger 70 includes front and rear cam surfaces 76, 78 which are each inclined at an acute angle relative to the longitudinal direction of the ramp. The locators 60 are spaced apart by a distance greater than the small diameter of the groove 58 and less than the outer diameter of the shaft 56 itself. If the groove 58 is not aligned with the slot 54 when the shaft 56 is pushed into the slot 54, the outer surface of the shaft will engage the front cam surfaces 76 and retract the locators 60, i.e., the fingers will be rotated outwardly away from the slot. The rear cam surfaces 78 enable a retaining ring 26 to push the locator outwardly as the ring is being installed within the groove 58 of the shaft 56. The rear cam surface 78 is preferably configured such that the finger 70 does not fully leave the groove 58 until a leading end of the ring has entered the groove.

The rings 26, especially in the case of E-rings, are provided with flats 80 along opposing legs 82 thereof, which flats face the side walls 50, 52 of the ramp 44. The width W of the ramp is dimensioned so that the flats 80 engage or at least almost engage, the side walls 50, 52 so that each ring will be restrained from rotating about an axis oriented perpendicularly to the plane of the ring as the ring is being pushed toward the workpiece. Hence, it is assured that the open end of the ring will remain aligned with the groove 58 in the shaft and will enter same. In the absence of the flats 80, the ring might become turned as it approaches the groove 58, whereupon the ring would simply be jammed against the groove 58 precluding its correct seating.

IN OPERATION, the nose assembly 22 is oriented such that the slot 54 is aligned with the shaft 56. The slot is then pushed onto the shaft. When the shaft reaches the inner end of the slot, the fingers 70 enter the grooves 58 to assure that the pusher 20 is aligned with the groove 58 (FIG. 2). If the fingers 70 are not aligned with the groove 58 when the slot is pushed onto the shaft, the outer surface of the shaft 56 will engage the front cam surfaces 76 and rotate the locators 60 about the pins 64 against the bias of the springs 72 whereupon the fingers 70 are pushed rearwardly and outwardly. It is then merely necessary to move the nose assembly 22 in the direction of the shaft axis until the fingers 70 become aligned with the groove 58, whereupon the fingers are snapped into the groove 58 by the action of the springs 72.

The slot 54 is stable relative to the shaft 56 since the width of the slot corresponds to the shaft diameter. Thus, the shaft axis will remain positioned substantially perpendicular to the plane of the floor 48, i.e., the plane defined by the groove 58 will remain parallel with the plane of the floor 48.

Figure 4:
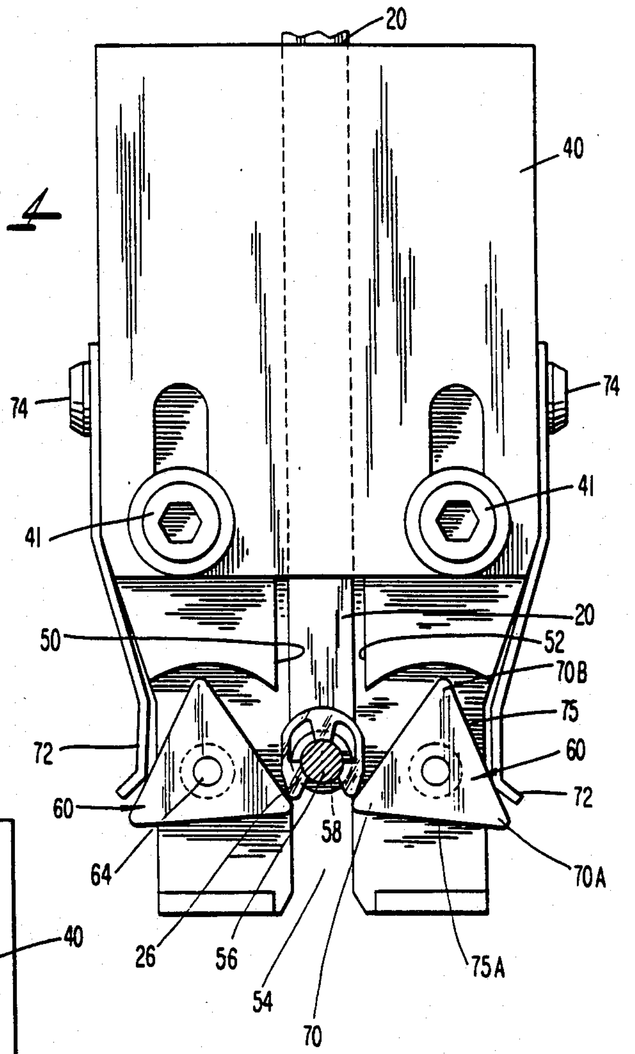
FIG. 4 is a view similar to FIG. 2 after a retaining ring has been pushed into the groove of the workpiece.
Figure 5:
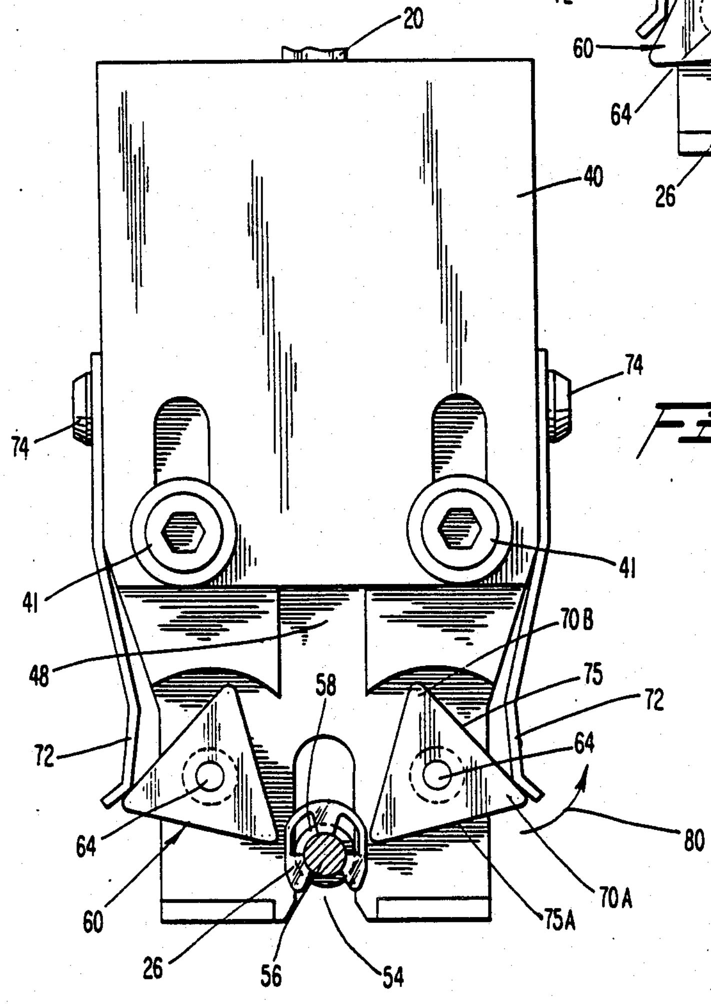
FIG. 5 is a view similar to FIG. 4 as the applicator is being removed from the workpiece.

The trigger 16 is then actuated to cause the pusher to be displaced forwardly to push the uppermost retaining ring 26 into engagement with the rear cam surfaces 78 of the fingers 70. During continued forward travel of the pusher 20, the retaining ring 26 enters the ring groove 58 while pushing the fingers 70 outwardly from the groove 58 in the forward direction (FIG. 4). Finally, the nose assembly is pulled away from the shaft 56 causing the fingers 70 to be further rotated forwardly and outwardly from the ramp 46 (FIG. 5).

It will be appreciated that since the axes of rotation of the locators 60 are aligned with the fingers 70 in a direction perpendicularly to the slot 54, the motion of the locators when cammed by the ring 26 will impose minimal flexing of the springs 72. Furthermore, any momentum of the locators which would cause the locators to overtravel, i.e., to travel beyond the minimal extent necessary to accommodate passage of the ring 26 (which overtravel is depicted in FIG. 5), merely results in the fingers 70A moving primarily rearwardly and radially inwardly (see arrow 80) rather than primarily radially outwardly. Thus, overtravel of the locator will not produce any further substantial flexing of the spring 72. Accordingly, there is no chance for the spring to be exessively stressed by such locator overtravel, as might have occurred in an apparatus of the type described in the afore-mentioned application Ser. No. 579,559. Furthermore, if the overtravel of the locators 60 results in the fingers 70A being moved rearwardly past the springs 72, then the springs 72 will now engage a different edge 75A and a new finger 70B will enter the ramp 46. Thus, even if there occurs overtravel of one or both of the locators, the locators will still present an identically configured structure to the ramp 46, ring 26, and springs 72, due to the triangular shape of the locators.

As the ring 26 is traveling toward the workpiece, engagement between the flats 80 of the ring and side walls 50, 52 of the ramp will maintain the open end of the ring in alignment with the workpiece. Hence, the ring will not be able to become skewed, but rather will assuredly enter the groove 58.

Although the present invention has been described in connection with preferred embodiments thereof, it will be appreciated by those skilled in the art that modifications, substitutions, deletions and additions not specifically described, may be made without departing from the spirit and scope of the invention as defined in the appended claims.

What is claimed is:

1. An applicator in combination with a radially assembled spring retaining ring which is to be assembled into an external groove of a workpiece, said applicator comprising:

a base plate forming a ramp having a floor and a pair of side walls, a forward end of said floor including a forwardly open slot for receiving a groove shaft, a groove locator means disposed on said base plate adjacent a forward end of said ramp and arranged to enter the groove in the workpiece when the latter is received in the slot, said ramp arranged to receive said spring retaining rings, said ring being flat and including a pair of legs spaced apart at their forward ends to define an open forward end of said ring, said ring being positioned in said ramp with said open forward end aligned with said slot, each said leg including a flat arranged to oppose a respective one of said side walls of said ramp, the spacing between said flats being substantially the same as the distance between said side walls, whereby said ring is constrained against rotation about an axis oriented perpendicularly to the plane of said ring which would crate misalignment between said ring open end and a workpiece disposed in said slot, and pusher means for forwardly pushing said ring along said ramp toward said slot.

2. An applicator according to claim 1, wherein said ring is an E-ring.

3. An applicator according to claim 1, including a magazine carrying a plurality of said rings and arranged to position said rings sequentially on said ramp.

4. In an applicator in combination with a plurality of radially assembled spring retaining rings for installing each of said rings into a groove in a shaft, said rings each being of the type which is flat and comprising a pair of legs spaced apart at their ends to define an open end of said ring, said applicator being of the type comprising a housing, a nose assembly mounted on said housing and including a base plate and a top plate overlying said base plate, said base plate forming a ramp along which a retaining ring may travel, said ramp having a floor and opposed side walls, a forward end of said floor forming a forwardly open slot having a width corresponding to the non-grooved diameter of the shaft, said ramp having an opening therein, a magazine mounted on said housing and communicating with said opening, said magazine being adapted to carrying a supply of spring retaining rings for introduction onto said ramp through said opening such that said open ends face said slot, and a fluid-driven pusher carried by said housing and arranged for reciprocable movement along said ramp to pick-off a retaining ring at said opening and push it forwardly toward the shaft disposed in said slot, the improvement wherein said legs of said ring each include a flat opposing a respective side wall of said ramp, the spacing between said flats being substantially the same as the distance between said side walls, whereby said ring is constrained against rotation about an axis oriented perpendicularly to the plane of said ring while said ring is being pushed along said ramp by said pusher whereby said ring open end remains aligned with the shaft.

* * * * *